United States Patent
Joe et al.

(10) Patent No.: US 7,101,308 B2
(45) Date of Patent: Sep. 5, 2006

(54) CONTROL APPARATUS AND METHOD FOR HYBRID VEHICLE

(75) Inventors: Shinichiro Joe, Kanagawa (JP); Taketoshi Kawabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 180 days.

(21) Appl. No.: 10/768,692

(22) Filed: Feb. 2, 2004

(65) Prior Publication Data

US 2004/0162182 A1 Aug. 19, 2004

(30) Foreign Application Priority Data

Feb. 14, 2003 (JP) ............................. 2003-035867

(51) Int. Cl.
*B60K 1/02* (2006.01)
(52) U.S. Cl. .............................. 477/3; 477/7; 180/65.6; 701/22
(58) Field of Classification Search ................ 477/2, 477/3, 7; 180/65.3, 65.6, 65.7; 701/22
See application file for complete search history.

(56) References Cited

U.S. PATENT DOCUMENTS

| | | | | |
|---|---|---|---|---|
| 5,558,589 | A | * | 9/1996 | Schmidt ........................ 475/5 |
| 5,931,757 | A | * | 8/1999 | Schmidt ........................ 475/2 |
| 6,087,734 | A | * | 7/2000 | Maeda et al. ............. 290/40 C |
| 6,208,034 | B1 | | 3/2001 | Yamaguchi |
| 6,625,524 | B1 | | 9/2003 | Yamaguchi et al. |

| | | |
|---|---|---|
| 2001/0017227 A1 | 8/2001 | Amano et al. |

FOREIGN PATENT DOCUMENTS

| | | |
|---|---|---|
| EP | 0 856 427 A1 | 8/1998 |
| EP | 1 149 725 A2 | 10/2001 |
| JP | 2000-32612 A | 1/2000 |
| JP | 2000-324607 A | 11/2000 |
| JP | 2000-324620 A | 11/2000 |
| JP | 2001-190006 A | 7/2001 |
| JP | 2001-309507 A | 11/2001 |
| JP | 2003-100773 | 4/2003 |
| JP | 2005-117779 | * 4/2005 |

OTHER PUBLICATIONS

U.S. Appl. No. 10/816,273, filed Apr. 2, 2004, Joe et al.

* cited by examiner

*Primary Examiner*—Ha Ho
(74) *Attorney, Agent, or Firm*—Foley & Lardner LLP

(57) ABSTRACT

In control apparatus and method for a hybrid vehicle, a target driving power and a target driving torque are calculates from at least one of detected values and estimated values of both of a vehicle speed and an accelerator opening angle, a target engine speed is calculated from the target driving power; and target values of motor torques of the first and second motors/generators and of an engine torque are set from at least one of revolution speed variation rates of any two revolution elements of a power transmission mechanism of the hybrid vehicle and a running resistance torque, the target engine speed, an engine speed, the target driving power, and the target driving torque in such a manner that no excessive lack in the driving torque for the target driving torque occurs and a deviation between the target engine speed and the engine speed is decreased.

20 Claims, 11 Drawing Sheets

CONTROL APPARATUS AND METHOD FOR HYBRID VEHICLE

BACKGROUND OF THE INVENTION

1. Field of the Invention

The present invention relates to control apparatus and method for a hybrid vehicle which are capable of controlling each operating point of first and second motor torques and an the engine and each drive torque of the first and second motors/generators and the engine in a steady-state manner and in a transient manner to aim at their target values.

2. Description of the Related Art

A conventional technology which suppresses an excessive lack in a driving torque due to a partial consumption of a torque developed by each motor/generator into a speed variation in each motor/generator itself in a hybrid vehicle in which powers developed by the engine and two motor/generators are synthesized and outputted to a drive axle of a hybrid transmission is well known as will be described below.

When a gear ratio represented by a ratio between an engine speed and a drive axle revolution speed is varied, first motor/generator and second motor/generator consume a part of torque developed due to the revolution speed variations in the first and second motors/generators themselves. Then, at this time, the torque supplied from each of the first motor/generator and second motor/generator to planetary gear unit becomes lack. Consequently, this results in an excessive lack of the driving torque. A Japanese Patent Application First Publication No. 2000-324620 published on Nov. 24, 2000 exemplifies a previously proposed control apparatus for a hybrid vehicle in which lacks in torques of both of the first and second motor/generators is estimated from a variation rate of one of the first and second motor/generator revolution speeds. This torque lack is added to a torque target value of each of the first and second motor/generators to suppress the excessive lack in driving torque.

SUMMARY OF THE INVENTION

However, in the previously proposed control apparatus described above, a torque correction is made under the following assumptions: (1) A torque developed due to a revolution speed variation between the planetary gear unit revolution element and the engine is neglected. (2) A vehicle speed variation is assumed to be zeroed when an insufficient torque of the other motor/generator is calculated from the one motor/generator revolution speed variation rate. Thus, under a situation in which the above-described assumptions are not established, the excessive lack in the driving torque cannot sufficiently be suppressed as described below and there is a possibility that a feeling of acceleration that a vehicle driver desires is not obtained.

When the gear ratio is varied, the torque is consumed by the speed variation of the planetary gear unit revolution elements and also by the speed variation of the engine. The torque consumed by the speed variations in the planetary gear unit revolution elements and the torque consumed by the speed variation in the engine are not negligibly small, as compared with the revolution speed variation of each of the first and second motors/generators. Hence, in the above-described previously proposed control apparatus for the hybrid vehicle, since the torque due to the planetary gear unit and the torque due to the revolution speed variation of the engine is neglected, a sufficient suppression of the excessively lacking driving torque cannot be achieved. It is general that the variation in the gear ratio is not instantaneously carried out but generally carried out within a limited time satisfying a gear shift feeling of the vehicle driver. Hence, while the gear ratio is varied, the vehicle is accelerated. In the above-described previously proposed control apparatus, since the vehicle speed variation at a time at which the lack of torque of the other motor/generator is calculated from the one motor/generator revolution speed variation rate is zeroed, it is not possible to calculate the insufficient motor torque of the other motor/generator with a high accuracy during the gear shift. Furthermore, since, in the torque calculation by means of the speed variations of the revolution elements of the planetary gear unit and by means of the torque calculation due to the speed variation of the engine, it is necessary to consider revolution speed variations of at least two revolution elements (revolution elements) from among the revolution elements of the planetary gear unit.

It is, therefore, an object of the present invention to provide control apparatus and method for the hybrid vehicle which are capable of providing the feeling of a vehicular acceleration that the driver desires by achieving a target driving torque with a high accuracy even if a vehicle speed is varied during the gear shift.

According to one aspect of the present invention, there is provided a control apparatus for a hybrid vehicle, comprising: a power transmission mechanism that is constituted by one or more of planetary gear units, that transmits a driving force developed in an engine to a drive axle and whose dynamic characteristic is represented in revolution two-degrees-of-freedom system; a first motor/generator that supplies a power to the drive axle via the power transmission mechanism; a second motor/generator that supplies the power at least one of directly and via the power transmission mechanism to the drive axle; a target driving force generating section that calculates a target driving power and a target driving torque from at least one of detected values and estimated values of both of a vehicle speed and an accelerator opening angle; a target engine speed calculating section that calculates a target engine speed from the target driving power; and a target torque calculating section that sets target values of motor torques of the first and second motors/generators and of an engine torque from at least one of revolution speed variation rates of any two revolution elements of the power transmission mechanism and a running resistance torque, the target engine speed, an engine speed, the target driving power, and the target driving torque in such a manner that no excessive lack in the driving torque for the target driving torque occurs and a deviation between the target engine speed and the engine speed is decreased.

According to another aspect of the present invention, there is provided a control method for a hybrid vehicle, comprising: providing a power transmission mechanism that is constituted by one or more of planetary gear units, that transmits a driving force developed in an engine to a drive axle and whose dynamic characteristic is represented in revolution two-degrees-of-freedom system; providing a first motor/generator that supplies a power to the drive axle via the power transmission mechanism; providing a second motor/generator that supplies the power at least one of directly and via the power transmission mechanism to the drive axle; calculating a target driving power and a target driving torque from at least one of detected values and estimated values of both of a vehicle speed and an accelerator opening angle; calculating a target engine speed from the target driving power; and setting target values of motor torques of the first and second motors/generators and of an engine torque from at least one of revolution speed variation rates of any two revolution elements of the power transmission mechanism and a running resistance torque, the target engine speed, an engine speed, the target driving power, and the target driving torque in such a manner that no excessive lack in the driving torque for the target driving torque occurs and a deviation between the target engine speed and the engine speed is decreased.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

First Embodiment

Figure 1:
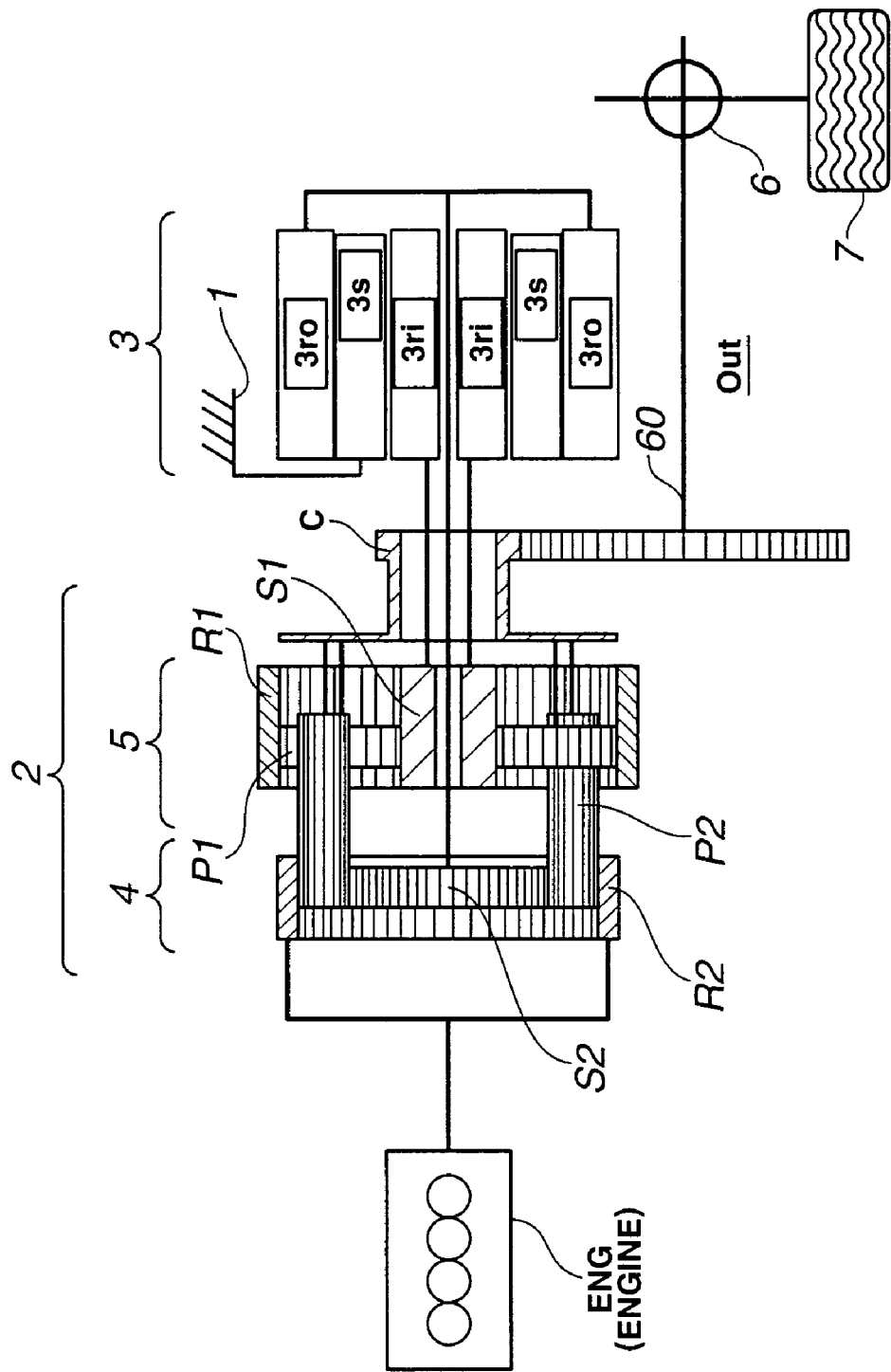
FIG. 1 is a whole system configuration view of a control apparatus of a hybrid vehicle in a first preferred embodiment according to the present invention.

FIG. 1 is a configuration view of a hybrid transmission to which a control apparatus for a hybrid vehicle in a first preferred embodiment according to the present invention is applicable. In the first embodiment, the hybrid transmission is used as a trans axle for a front-engine-front-wheel-drive vehicle (FF car).

In FIG. 1, in the hybrid transmission, as viewed from left side of FIG. 1, an engine ENG, a Ravigneaux (type) planetary gear unit 2, and a compound current double layer motor 3 are coaxially arranged. The Ravigneaux (type) planetary gear unit 2 includes a second single pinion planetary gear unit 4 and first single pinion planetary gear unit 5, both of first and second pinion planetary gear units 4 and 5 having a common (us pinion P2. Second single pinion planetary gear unit 4 has a structure in which pinion P2 is meshed with a sun gear S2 and a ring gear R2. First single pinion planetary gear unit 5 is provided with a ring gear P1, a large-diameter pinion P1 in addition to sun gear S1 and common pinion P2, and the large-diameter pinion P1 is meshed with three elements of sun gear S1, ring gear R1, and common pinion P2. Then, all of pinions P1 and P2 of the planetary gear units 4 and 5 are rotatably supported by means of a common carrier C. It is noted that, in a case where this Ravigneaux (type) planetary gear unit is viewed in a longitudinal row, the two single pinion planetary gear units 4 and 5 are disposed as described above. In a case where Ravigneaux (type) planetary gear units 2 are viewed in a mutually intersecting cross row, two double pinion planetary gear units having mutually meshed large diameter pinion P1 and common pinion P2 can be deemed to be provided.

Ravigneaux (type) planetary gear unit 2 described above includes seven revolution members (elements) of sun gear S1, sun gear S2, ring gear R1, ring gear R2, pinion P1, and pinion P2, and carrier C as main elements. Ravigneaux (type) planetary gear unit has two degrees of freedom such that, when revolution speeds of two members from among the seven revolution members are determined, the revolution speeds of the other revolution members are determined. A crankshaft of engine ENG is coupled to ring gear R2 so that a revolution of engine ENG disposed coaxially at a right side viewed from FIG. 1 with respect to Ravigneaux (type) planetary gear unit 2 is inputted to ring gear R2, in the first embodiment. On the other hand, a road wheel drive system Out (for example, final differential gear 6 and left and right driven road wheels 7) is coupled to this carrier C via a drive axle 60 so that the output revolution speed from Ravigneaux (type) planetary gear is taken out from a common carrier C.

Compound current double layer motor 2 is so structured that an inner rotor 3ri and an annular outer rotor 3ro enclosing inner rotor 3ri are rotatably and coaxially supported on a rear axle end within transmission casing 1 and a stator 3s constituted by annular coils and disposed coaxially between an annular space between inner rotor 3ri and outer rotor 3ro is fixed onto a transmission casing 1. Thus, both of annular coil 3s and outer rotor 3ro constitute a second motor/generator MG2 at an outer side and annular coil 3s and inner rotor 3ri constitute first motor/generator MG1 at an inner side. Each of first and second motor/generators MG1 and MG2 functions as a motor which outputs revolutions in individual directions in accordance with the supply current when a compound current (AC) is supplied and in individual speeds in accordance with the supplied compound current (a stop inclusive). When no compound current is supplied, each of first and second motor/generators MG1 and MG2 function as a generator developing a power in accordance with a revolution of an external force. When the above-described compound current double layer motor 3 and Ravigneaux planetary gear unit 2 are coupled together, first motor/generator MG1 (in details, inner rotor 3ri) is coupled to sun gear S1 of double pinion planetary gear unit 5 and second motor/generator MG2 (in details, outer rotor 3or) is coupled to sun gear S2 of double pinion planetary gear unit 4.

Figure 2:
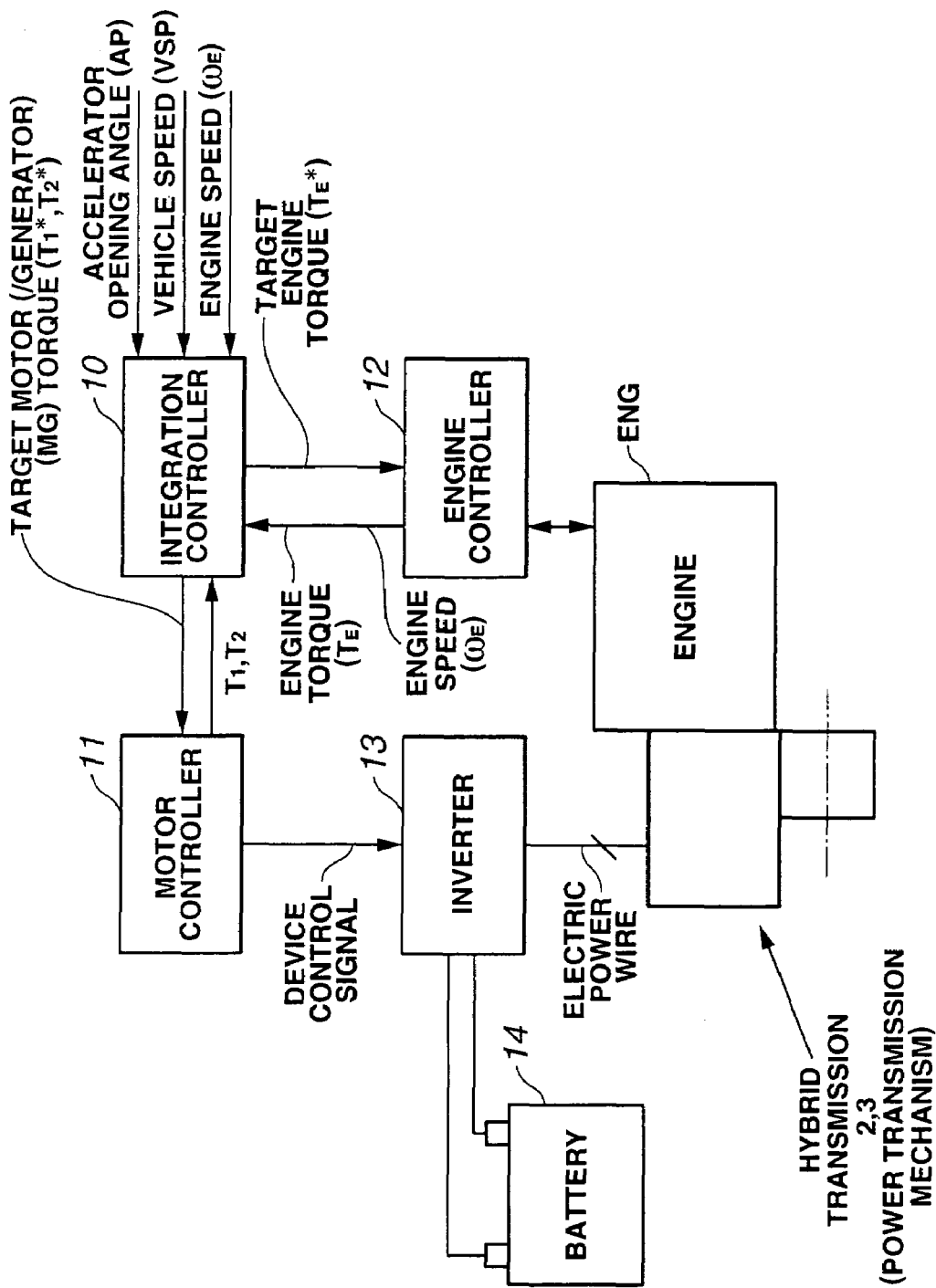
FIG. 2 is a whole schematic block diagram of the control apparatus in the first embodiment shown in FIG. 1.

FIG. 2 shows a schematic block diagram of a whole hybrid system including controllers. The hybrid system includes an integration controller 10 which performs an integration control of a whole energy, an engine controller 12 which controls engine ENG, a motor controller 11 which controls first and second motor/generators MG1 and MG2 within the hybrid transmission, an inverter 13, a battery 14, and a hybrid transmission 2, 3 having motor/generators MG1 and MG2. It is noted that motor controller 11 outputs the first and second motor torques $T_1$ and $T_2$ to the integration controller 11 and engine controller 12 outputs an engine torque $T_E$ and an engine speed $\omega_E$ to integration controller 10.

Integration controller 10 commands motor controller 11 to a target MG (motor/generator) torque and commands engine controller 12 to a target engine torque ($T_E^*$) so as to achieve the driving state that the driver intends in accordance with an accelerator opening angle AP, engine speed $\omega_E$, and vehicle speed VSP (which is proportional to an output axle revolution speed (of Ravigneaux (type) planetary gear unit). Revolution speeds to be inputted to integration controller 10 are not limited to the engine speed and the output axle revolution speed. Revolution speeds from any two of the revolution elements of Ravigneaux (type) planetary gear unit 2. Because the revolution degree of freedom of Ravigneaux (type) planetary gear unit 2 is two, any two of the revolution speeds of the revolution elements are known. In addition, since a command value to motor controller 11 is not only the target MG torque but also may be a target MG revolution and, at an inside of motor controller 11, a control system achieving the revolution speed of target MG revolution speed by means of, for example, a PI (Proportion and Integration) controller may be provided.

Figure 3:
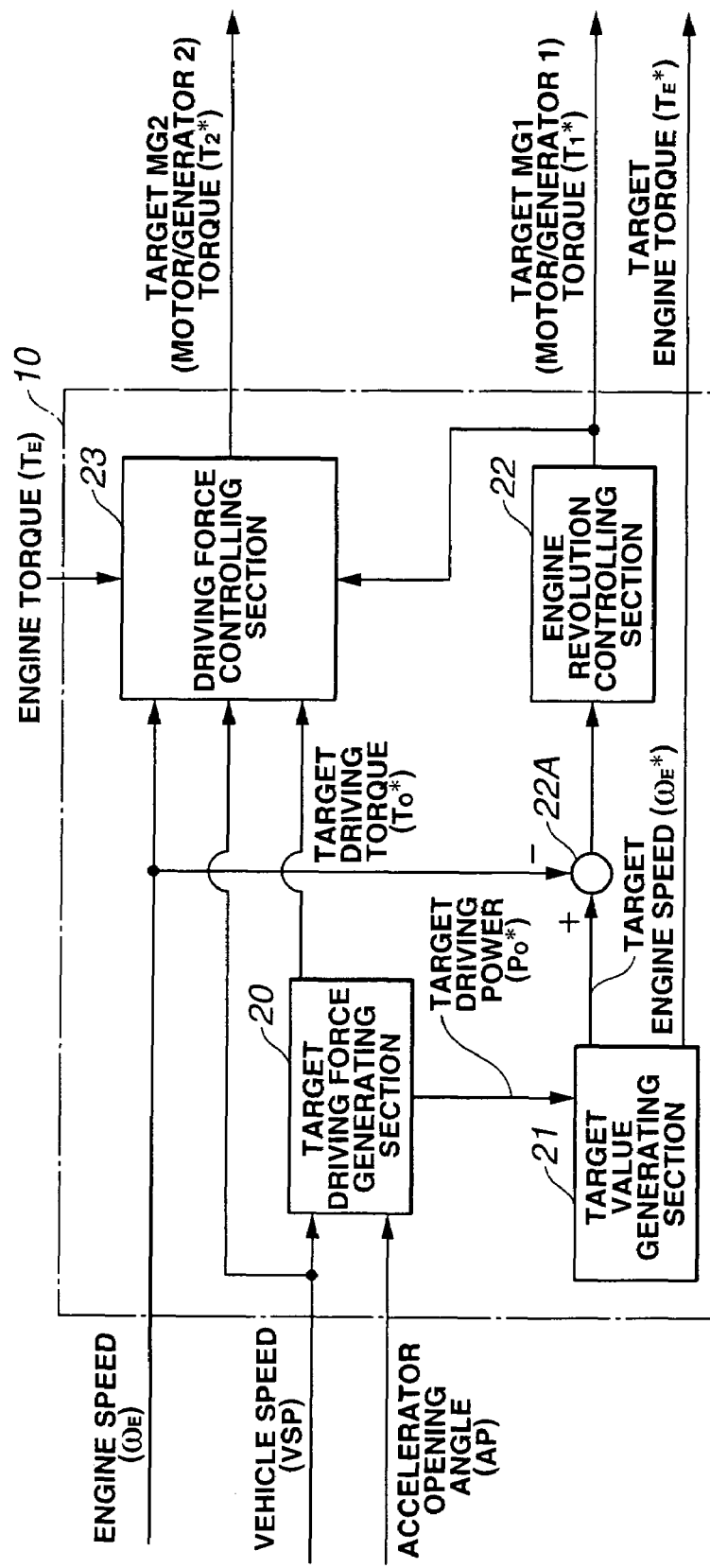
FIG. 3 is a whole block diagram of a control executed by an integration controller in the first embodiment shown in FIG. 1.

FIG. 3 shows a block diagram of a control executed by integration controller 10 of the first embodiment. Integration controller 10 in the first embodiment includes, in terms of software, a target driving force generating section 20, a target value generating section 21, an engine revolution controlling section 22, and a driving force controlling section 23.

Figure 4:
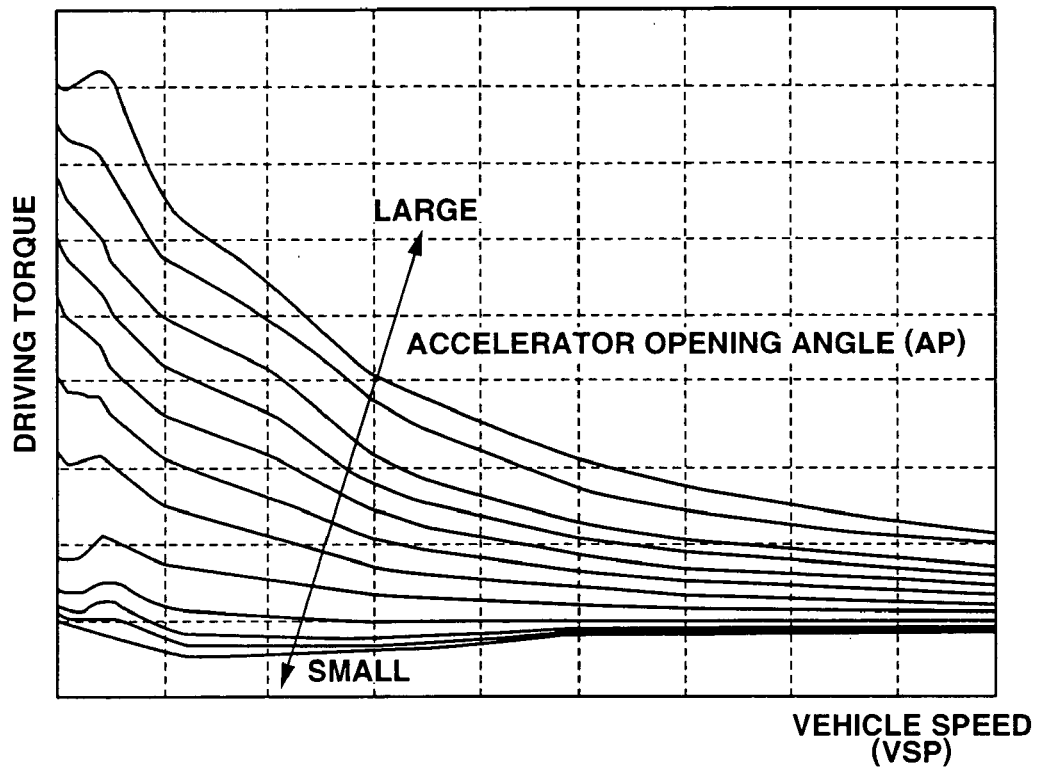
FIG. 4 is a torque map view on a driving (drive) torque.

Target driving force generating section 20 calculate a target driving torque $T_0^*$ and a target driving power $P_0^*$ from accelerator opening angle AP and vehicle speed VSP. First, target driving force generating section 20 calculates target driving torque $T_0^*$ on the hybrid transmission output axle using a driving torque map shown in FIG. 4. It is noted that vehicle speed VSP is calculated using the following equation from an output axle revolution speed $\omega_0$.

$$VSP = kv \cdot \omega_0 \quad (1).$$

In equation (1), Kv denotes a constant determined according to a radius of a representative tire wheel and a final gear ratio. Target driving power $P_0^*$ is calculated using the following equation of $P_0^*$ from target driving torque $T_0^*$ and output axle revolution speed $\omega_0$.

$$P_0^* = \omega_0 \cdot T_0^* \quad (2)$$

Target value generating section 21 calculates a target engine (revolution) speed $\omega_E^*$ and a target engine torque $T_E^*$ in accordance with target driving power $P_0^*$. For example, in a case where target driving power $P_0^*$ is supplied from engine ENG as target engine speed $\omega_E^*$ and target engine torque $T_E^*$, target driving power $P_0^*$ may be an engine operating point which provides an optimum fuel consumption. First, using a fuel consumption target engine speed map shown in FIG. 5, target engine torque $T_E^*$ may be calculated using the following equation from target driving power $P_0^*$ and target engine revolution speed $\omega_E^*$.

$$T_E^* = P_0^* / \omega_E^* \quad (3).$$

Referring back to FIG. 3, engine speed (revolution) controlling section 22 inputs a deviation between target engine speed $\omega_E^*$ and engine speed $\omega_E$ and determines a target MG1 torque $T_1^*$ for the deviation to be reduced (for example, recited in an original claim 3). That is to say, a target MG1 torque $T_1^*$ may be calculated using PI controller shown in the following equation (4).

$$T_1^* = \{T_P + (K_I/s)\} \cdot (\omega_E^* - \omega_E) \quad (4).$$

In equation (4), $K_P$ and $K_I$ denote proportional gain and integration gain in the PI controller and s denotes a Laplace transform operator.

Driving force controlling section 24 sets target MG2 torque $T_2^*$ so as to achieve target driving torque $T_0^*$ even under the gear shift operation or under an acceleration driving (for example, recited in the original claim 3).

A motion equation for each revolution element of Ravigneaux (type) planetary gear unit can be represented in corresponding equations as follows:

Second Single Pinion Planetary Gear Unit Sun Gear:

$$(I_{s2}+I_2)\omega'_2 = T_2 + r_{s2}F_1 \quad (5).$$

Second Single Pinion Planetary Gear Unit Pinion Gear:

$$I_{P2}\omega'_{p2} = r_{p2}(F_1+F_2+F_3) \quad (6).$$

Second Single Pinion Planetary Gear Ring Gear:

Common Carrier:

$$(I_c+I_v)\omega'_1 = T_1 + r_{s1}F_4 \quad (7).$$

First Single Pinion Planetary Gear Unit Pinion Gear:

$$(I_{s1}+I_1)\omega'_1 = T_1 + r_{s1}F_4 \quad (8).$$

First Single Pinion Planetary Gear Ring Gear:

$$I_{s1}\omega'_{R1} = -r_{s1}F_5 \quad (9).$$

First Single Pinion Planetary Gear Pinion Gear:

$$I_{P1}\omega'_{R1} = -r_{P1}(F_3+F_4+F_5) \quad (10).$$

First Single Pinion Planetary Gear Ring Gear:

$$I_{s1}\omega'_{R1} = -r_{R1}F_5 \quad (11).$$

In equations (5) through (11), each subscript denotes a name of Ravigneaux (type) planetary gear unit, I denotes an inertia moment, $\omega$ denotes a revolution speed, r denotes a radius, ($T_E$ denotes the engine torque, $T_1$ denotes the MG1 torque, $T_2$ denotes the MG2 torque,) $T_R$ denotes a running resistance torque, $I_1$ denotes an MG1 inertia moment, $I_2$ denotes an MG2 inertia moment, $I_E$ denotes an engine inertia moment, Iv denotes a vehicular inertia, $F_1$ through $F_5$ denote internal stresses.

The driving torque on the output axle is assumed as $T_0$ and a motion equation of carrier C is expressed as follows:

$$(I_c+Iv)\omega'_0 = T_0 - T_R \quad (12).$$

Hence, from equations of (8), (12), (5), (7), (9), and (11), driving torque $T_0$ can be expressed as follows:

$$T_0 = T_1+T_2+T_E-(I_{s1}+I_1)\omega'_1-(I_{s2}+I_2)\omega'_2-(IR2+I_E)\omega'_E - I_{R1}\omega'_E-I\omega'_{R1} \quad (13).$$

Using equation (13), target MG2 torque $T_2^*$ can be calculated by the following equation (14). (for example, as recited in original claims 1 and 3).

$$T_2^* = T_0^* - T_1^* - T_E + (I_{s1} + I_1)\omega'_2 + (I_{R2} + I_2)\omega'_E + I_{R1}\omega'_{R1} \quad (14)$$

In equations (13) and (14), $\omega'_E$ is derived by a differentiation or differential of $\omega'_E$. $\omega'_1$, $\omega'_2$, and $\omega'_{R1}$ are derived from $\omega'_E$ and $\omega'_0$ using a revolution acceleration constraint of Ravigneaux (type) planetary gear unit.

Constraint equation of the revolution acceleration is described in the following equations.

$$r_{R2}\omega'_E = r_{P2}\omega'_{P2} + r_{R2}\omega'_0 \quad (15)$$

$$R_{s2}\omega'_2 = r_{s2}\omega'_0 + r_{R2}\omega'_{P2} \quad (16)$$

$$r_{P1}\omega'_{P1} + r_{P2}\omega'_{P2} = 0 \quad (17)$$

$$r_{R1}\omega'_{R1} = r_{s2}\omega'_{P1} + r_{R2}\omega'_0 \quad (18)$$

$$r_{S1}\omega'_1 = r_{S1}\omega'_0 - r_{P2}\omega'_{P1} \quad (19)$$

The restraint equations of the revolution acceleration are a time differentiation of both sides of the constraint equation of the revolution speed. This constraint equations of the revolution acceleration can be summarized and rewritten as follows:

$$\omega'_b = C \, \omega'_a$$

$$\omega_b = [\omega_1 \, \omega_2 \, \omega_{P1} \, \omega_{P2} \, \omega_{R1}]^T,$$

$$\omega_a = [\omega_E \, \omega_0]^T \quad (20)$$

$$C = \begin{bmatrix} -r_{R2}/r_{S1} & 1 - r_{R2}/r_{S1} \\ -r_{R2}/r_{S2} & 1 + r_{R2}/r_{S2} \\ -r_{R2}/r_{P1} & r_{R2}/r_{P1} \\ r_{R2}/r_{P2} & -r_{R2}/r_{P2} \\ -r_{R2}/r_{R1} & 1 + r_{R2}/r_{R1} \end{bmatrix}$$

From this revolution acceleration constraint equations, a revolution degree of freedom of Ravigneaux (type) planetary gear unit is indicated as 2.

Using equation (14), target MG2 torque $T_2^*$ is commanded so that an inertia torque during a gear shift or during the acceleration permits a compensation of an excessive lack in the driving torque to target driving torque $T_0^*$. Consequently, target driving torque $T_0^*$ can be achieved with a high accuracy and the acceleration feeling which is approximate to the vehicle driver's desire can be obtained.

Figure 6:
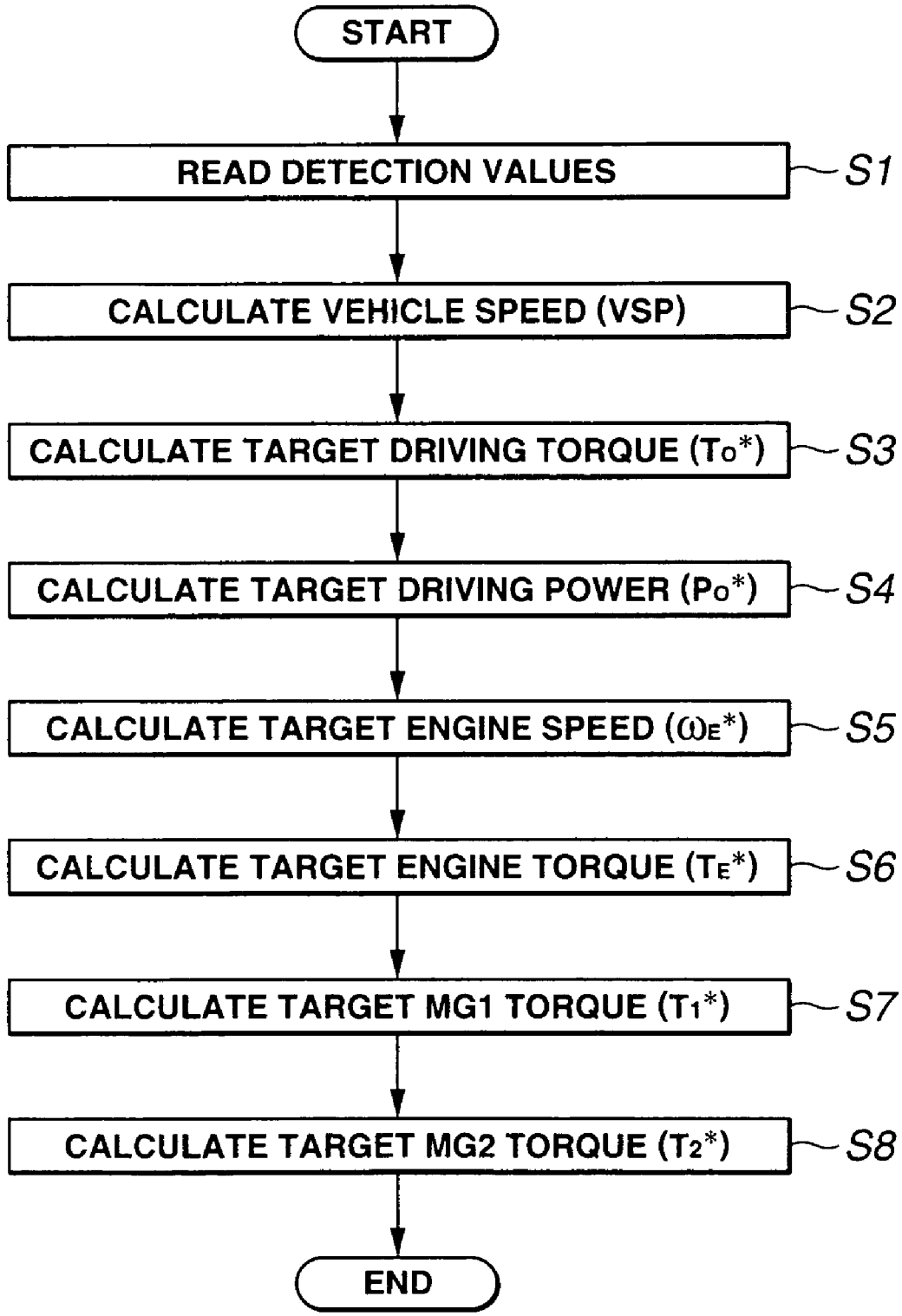
FIG. 6 is an operational flowchart representing a control calculation process executed by the integration controller of the control apparatus in a second preferred embodiment according to the present invention.

Next, an operation of the control apparatus for the hybrid vehicle in the first embodiment according to the present invention will be described below. That is to say, a control procedure executed by integration controller 10 will be explained with reference to an operational flowchart shown in FIG. 6. This gear shift control calculation routine is executed for each of a predetermined control period, for example, 20 milliseconds.

At a step S1, integration controller 10 reads detection values of throttle valve opening angle (or accelerator opening angle) AP, engine speed $\omega_E$, revolution speed of output axle 60 $\omega_0$, and engine torque L. At a step S2, integration controller 10 calculates target driving torque $T_0^*$ using a drive torque map shown in FIG. 4 according to vehicle speed VSP and throttle valve (or accelerator) opening angle AP.

At a step S3, integration controller 10 calculates target driving torque $T_0^*$ using drive torque map from vehicle speed VSP and throttle valve opening angle (or accelerator opening angle) AP.

At a step S4, using equation (2), integration controller 10 calculates target driving power $P_0^*$ from target driving torque $T_0^*$ and revolution speed $\omega_0$ of the output axle.

Figure 5:
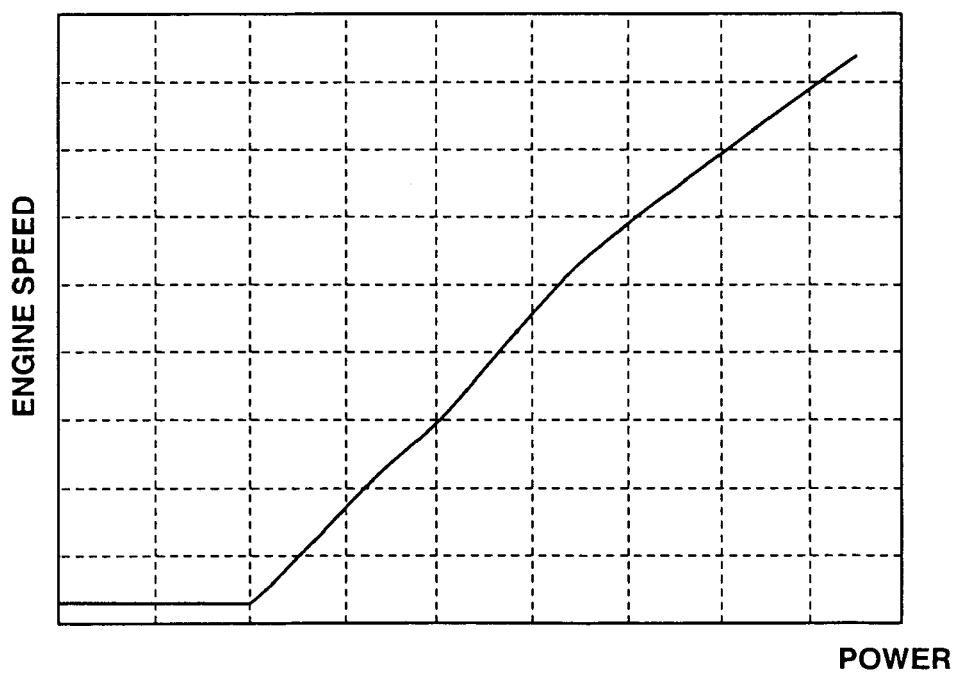
FIG. 5 is an optimum fuel consumption view of an engine speed map.

At a step S5, integration controller 10 calculates target engine revolution speed $\omega_E^*$ using fuel consumption optimum target engine revolution map shown in FIG. 5. At a step S6, integration controller 10 calculates target engine revolution speed $\omega_E^*$ using the fuel consumption optimum target engine revolution speed $P_0^*$ and target engine revolution speed $\omega_E^*$. At a step S7, integration controller 10 determines target MG1 torque $T_1^*$ to decrease a deviation between target engine speed $\omega_E^*$ and engine speed $\omega_E$ using the PI controller shown in equation (4). At a step S8, integration controller 10 calculates target MG2 torque $T_2^*$ from target driving torque $T_0^*$, target engine speed $\omega_E^*$, and output axle revolution speed $\omega_0$ using equation (14). It is noted that, as described before, $\omega'_1$, $\omega'_2$, $\omega'_{R1}$ are derived from $\omega'_E$ and $\omega'_0$ using the revolution acceleration constraint equations (refer to equations (15) through (20)) of each Ravigneaux (type) planetary unit revolution element. It is also noted that target MG1 torque $T_1^*$ used in equation (14) may be replaced with the MG1 torque $T_1$ and engine torque $T_E$ may be replaced with target engine torque $T_E^*$.

Next, advantages of the control apparatus for the hybrid vehicle in the first embodiment described above will be described below.

(1) In the hybrid vehicle control apparatus in the first embodiment, the hybrid vehicle having Ravigneaux (type) planetary gear unit 2 which is constituted by one or more planetary gear units, in which the power developed in engine ENG is transmitted to the drive axle (60) and whose dynamic characteristic is expressed in the revolution two-degrees-of-freedom, first motor/generator MG1 whose power is supplied to the drive axle via Ravigneaux (type) planetary gear unit 2, and a second motor/generator MG2 which supplies the power directly or via Ravigneaux (type) planetary gear unit 2 to the drive axle (60), there is provided with target driving force generating section 20 which calculates target driving power $P_0^*$ and target driving torque $T_0^*$ from the detection value or estimated value of vehicle speed VSP and accelerator opening angle AP, target value generating section 21 (target engine speed calculating section (means)) which calculates target engine speed $\omega_E^*$ from target driving power $P_0^*$, and the target torque calculating section which sets target values of $T_1^*$, $T_2^*$, $T_E^*$ of the first and second motor torques $T_1$ and $T_2$ and engine torque $T_E$, from among the revolution speed variation quantity of any two of Ravigneaux (type) planetary gear unit revolution elements, target engine speed $\omega_E^*$, engine speed $\omega_E$, target driving power $P_0^*$, and target driving torque $T_0^*$, the excessive lack of the driving torque to target driving torque $T_0^*$ does not occur and the deviation between target engine speed $\omega_E^*$ and actual engine speed $\omega_E$ is decreased. Hence, even if vehicle speed VSP is varied during the gear shift, target driving torque $T_0^*$ is achieved with a high accuracy and the acceleration feeling that the driver desires can be obtained.

(2) Since the above-described target torque calculating section includes target value generating section 21 that calculates target engine torque $T_E^*$ from target driving power $P_0^*$ (target engine torque generating section), engine revolution controlling section 22 (first motor torque calculating section) which determines target MG1 torque $T_1^*$ to reduce the deviation between target engine speed $\omega_E^*$ and engine revolution speed $\omega_E$, and a driving force controlling section 23 (second motor torque calculating section) which determine target MG2 torque $T_2^*$ from target driving torque $T_0^*$, engine torque $T_E$, and target MG1 torque $T_1^*$ using a linear coupling equation from among target driving torque $T_0^*$, engine torque $\omega_E$, target MG1 torque $T_1^*$, and target MG2 torque $T_2^*$ which establishes even if revolution speeds of any two of the revolution elements of Ravigneaux (type) planetary gear unit 2 is varied, target driving torque $T_0^*$ can be achieved even if the revolution speeds of any two of the revolution elements of Ravigneaux (type) planetary gear unit 2 are varied while realizing target engine speed $\omega_E^*$.

Second Embodiment

In the hybrid vehicle control apparatus in a second preferred embodiment according to the present invention, the structure of the hybrid transmission is shown in FIG. 1 and the hybrid system is shown in FIG. 2. These are the same as those described in the first embodiment and the detailed description thereof will herein be omitted.

Figure 7:
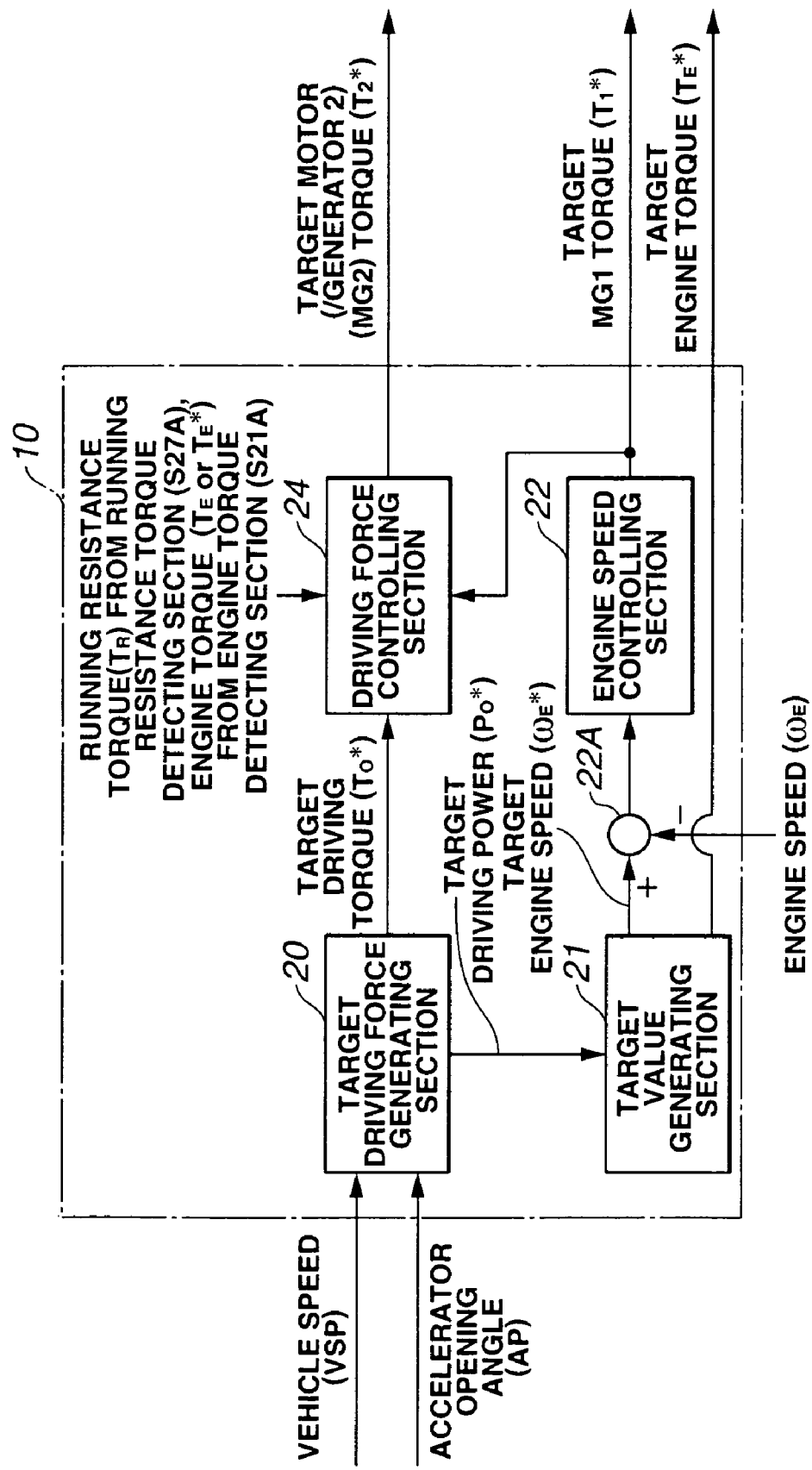
FIG. 7 is a whole functional block diagram executed by the integration controller in a second preferred embodiment according to the present invention.

FIG. 7 shows a control block diagram executed by integration controller 10 in the second embodiment. It is noted that since target driving force generating section 20, target value generating section 21, and engine speed controlling section 22 have the same functions as described in the first embodiment and their detailed description will be omitted herein.

A driving force controlling section 24 sets target MG2 torque $T_2^*$ to achieve target driving torque $T_0^*$ even during the gear shift and during the vehicular acceleration.

The dynamic characteristic of Ravigneaux (type) planetary gear unit 2 is expressed from equations (5), (11), and (20) with, for example, engine speed $\omega_E$ and output axle revolution speed $\omega_0$ as state variables. That is to say, $$\omega'_E = b_{11}T_R + b_{12}T_E + b_{13}T_1 + b_{14}T_2 \quad (21)$$

$$\omega'_0 = b_{21}T_R + b_{22}T_E + b_{23}T_1 + b_{24}T_2 \quad (22)$$

In equations (21) and (22), each b+ subscript denotes a constant determined from the radius of the revolution elements of Ravigneaux planetary gear unit 2 and the inertia moment thereof. If $\omega'_0$ is erased from equation (12) and equation (22), the following equation can be obtained from equation (12) and equation (22).

$$T_0 = \{(I_C + I_V)b_{21} + 1\}T_R + (I_C + I_V)b_{23}T_1 + (I_C + I_V)b_{24}T_2 \quad (23)$$

Utilizing equation (23), target MG2 torque $T_2^*$ can be calculated using the following equation.

$$T_2^* = \frac{T_0^* - \{I_C + I_V)b_{21} + 1\}T_R - (I_C + I_V)T_E - (I_C + I_V)b_{22}T_E - (I_C + I_V)b_{23}T_1^*}{(I_C + I_V)b_{24}} \quad (24)$$

It is noted that running resistance torque $T_R$ may, for example, be estimated using an external disturbance observer (as recited in an original claim 6). The running torque detecting section S27A will be described below to estimate the running resistance torque $T_R$. Then, the following describes a disturbance observer. First, the dynamic characteristic of Ravigneaux (type) planetary gear unit 2 expressed in equations (21) and (22) are expressed in a state space representation as described in the following equation.

$$\chi' = B\mu \quad (25)$$

In equation (25), $$\chi = \begin{bmatrix} \omega_E \\ \omega_0 \end{bmatrix}, \mu = \begin{bmatrix} T_R \\ T_E \\ T_1 \\ T_2 \end{bmatrix}, B = \begin{bmatrix} b_{11} & b_{12} & b_{13} & b_{14} \\ b_{21} & b_{22} & b_{23} & b_{24} \end{bmatrix}. \quad (25)$$

Since engine speed $\omega_E$ and output axle revolution speed $\omega_0$ is detectable, an output equation is expressed in the following equation (26):

$$y = C\chi \quad (26)$$

$$y = [\omega_E \ \omega_0]^T, C = \begin{bmatrix} 1 & 0 \\ 0 & 1 \end{bmatrix}^T.$$

Assuming that running resistance torque $T_R$ is a constant external disturbance, in addition to the state variable, the dynamic characteristic of Ravigneaux (type) planetary gear unit 2 is expanded to be represented as in the following equation (27).

$$\chi'_d = A_d \chi_d + B_d \mu_d \quad (27)$$

$$\chi_d = \begin{bmatrix} \omega_E \\ \omega_0 \\ T_R \end{bmatrix}, \mu_d = \begin{bmatrix} T_E \\ T_1 \\ T_2 \end{bmatrix}, A = \begin{bmatrix} 0 & 0 & b_{11} \\ 0 & 0 & b_{21} \\ 0 & 0 & 0 \end{bmatrix},$$

$$B = \begin{bmatrix} b_{12} & b_{13} & b_{14} \\ b_{22} & b_{23} & b_{24} \\ 0 & 0 & 0 \end{bmatrix}.$$

An output equation in the expansion system is represented in the following equation (28).

$$y = C_d \chi_d \quad (28)$$

$$y = [\omega_E \ \omega_0]^T, C_d = \begin{bmatrix} 1 & 0 & 0 \\ 0 & 1 & 0 \end{bmatrix}^T.$$

From the above equations (27) and (28), this expansion system is observable. Hence, the state variables can be estimated by means of the external disturbance observer. The external observer can be designed as follows:

$$\chi'_d = A_d \chi_d + B_d \mu_d + H(y - y_d) \quad (29).$$

In equation (29), H denotes an observer gain and is set in such a manner that the state variable is converged into an exponential function manner.

By estimating running resistance torque $T_R$ by means of equation (27) expressed by equation (29) and by setting target MG2 torque using equation (27), the excessive lack in the driving torque with respect to target driving torque $T_0^*$ due to the gear shift and vehicular acceleration can be compensated without deriving the revolution speed by differentiating the revolution speed or making differences thereof. Furthermore, the differentiation calculation is not included in the calculation of the target MG2 torque $T_2^*$. Hence, a vibrative target MG2 torque $T_2^*$ due to the influence of noises can be prevented from occurring. Consequently, target driving torque $T_0^*$ can be achieved so that an acceleration feeling approximated to a desire of the vehicle driver.

Figure 8:
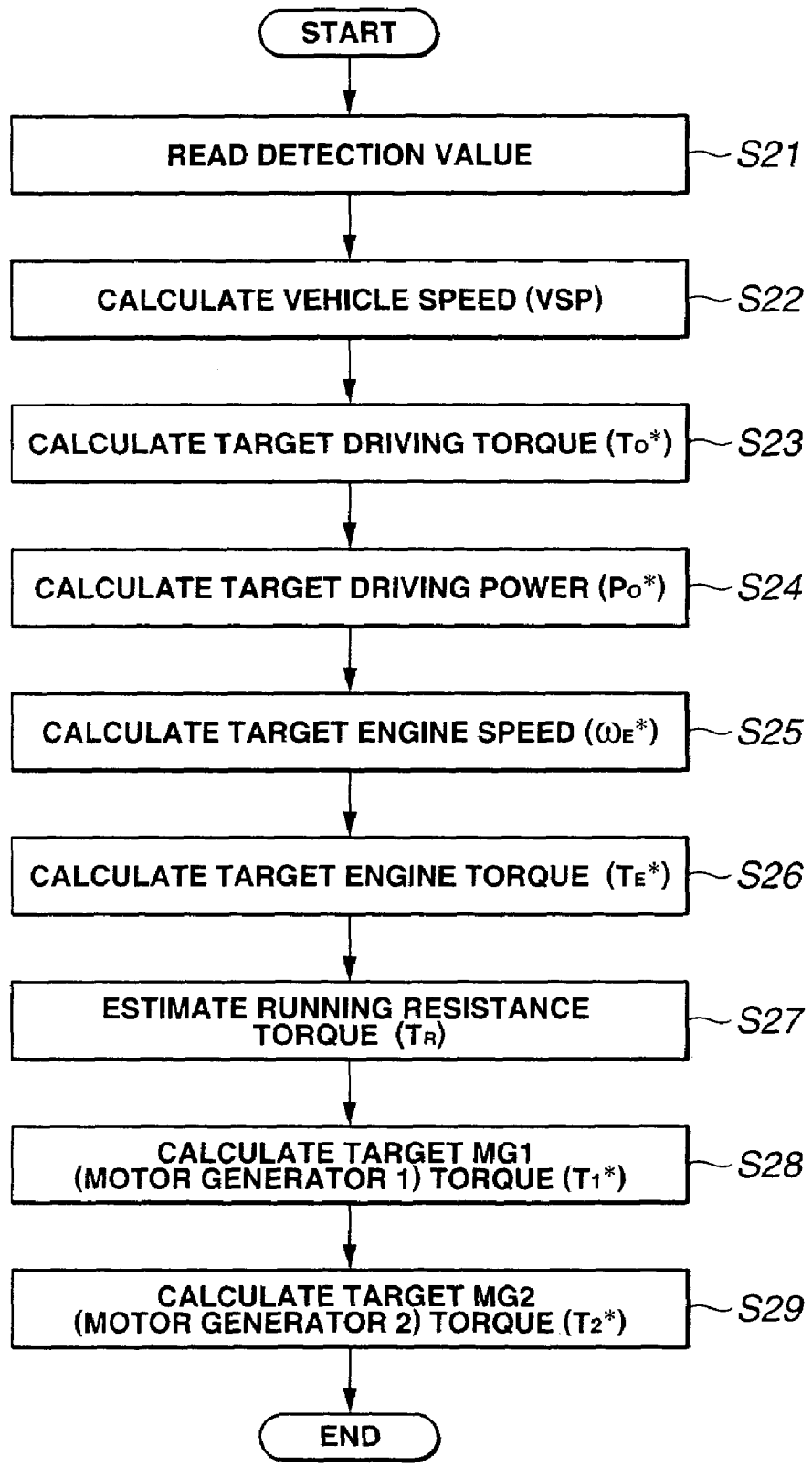
FIG. 8 is an operational flowchart representing a control calculation processing executed by the integration controller in the second preferred embodiment.

Next, an operation of the second embodiment of the control apparatus will be described below. Control and arithmetic operation (calculation) procedure executed by integration controller 10 in the second embodiment will be described with reference to an operational flowchart shown in FIG. 8. The gear shift control calculation is executed for a certain predetermined control period, for example, 20 milliseconds.

Since processing contents of steps S21 to S26 are the same as those of steps S1 through S6 in the flowchart in the first embodiment (FIG. 6), the detailed explanation will be omitted herein. At a step S27, equation (27) is used to estimate running resistance torque $T_R$. At a step S28, since step 28 is the same as step S7 shown in the flowchart of FIG. 6 described in the fist embodiment, the detailed explanation thereof will be omitted herein. At a step S29, target MG2 torque $T_2^*$ is calculated from target driving torque $T_0^*$, target MG1 torque $T_1^*$, engine torque $T_E$, running resistance torque $T_R$, engine speed $\omega_E$, and output axle revolution speed $\omega_0$. It is noted that target MG1 torque $T_1^*$ used in equation (24) may be MG1 torque $T_1$ and engine torque $T_E$ may be target engine torque $T_E^*$.

Next, advantages of the control apparatus for the hybrid vehicle in the second embodiment will be described below in addition to the advantage of item (1) described in the first embodiment.

(3) Since the target torque calculating section calculates a quantity corresponding to the revolution speed variations in any two of the revolution elements of Ravigneaux (type) planetary gear unit from running resistance torque $T_R$, engine torque $T_E$, MG1 torque $T_1$, and MG2 torque $T_2$, the revolution speed variation can be obtained from the speed variation due to the torque acted upon Ravigneaux (type) planetary gear unit 2 can be obtained without deviation from the difference or differentiation of the revolution speed. Even if the noises are mixed in the detection value of the revolution speed, an amplification of the noise due to the difference or differentiation calculation can be suppressed.

(4) The running resistance torque detecting section (S27A) estimates the running resistance torque $T_R$ using the observer from the revolution speeds of any two revolution speeds of Ravigneaux (type) planetary gear unit 2, engine torque $T_E$, MG1 torque $T_1$, and MG2 torque $T_2$. Hence, running resistance torque $T_R$ can be estimated with no necessity of using a gradient sensor to directly detect running resistance torque $T_R$. Consequently, an increase in its manufacturing cost can be suppressed. It is noted that engine torque TE is detected from engine torque detecting section (S21A) of engine controller 12.

Third Embodiment

Figure 9:
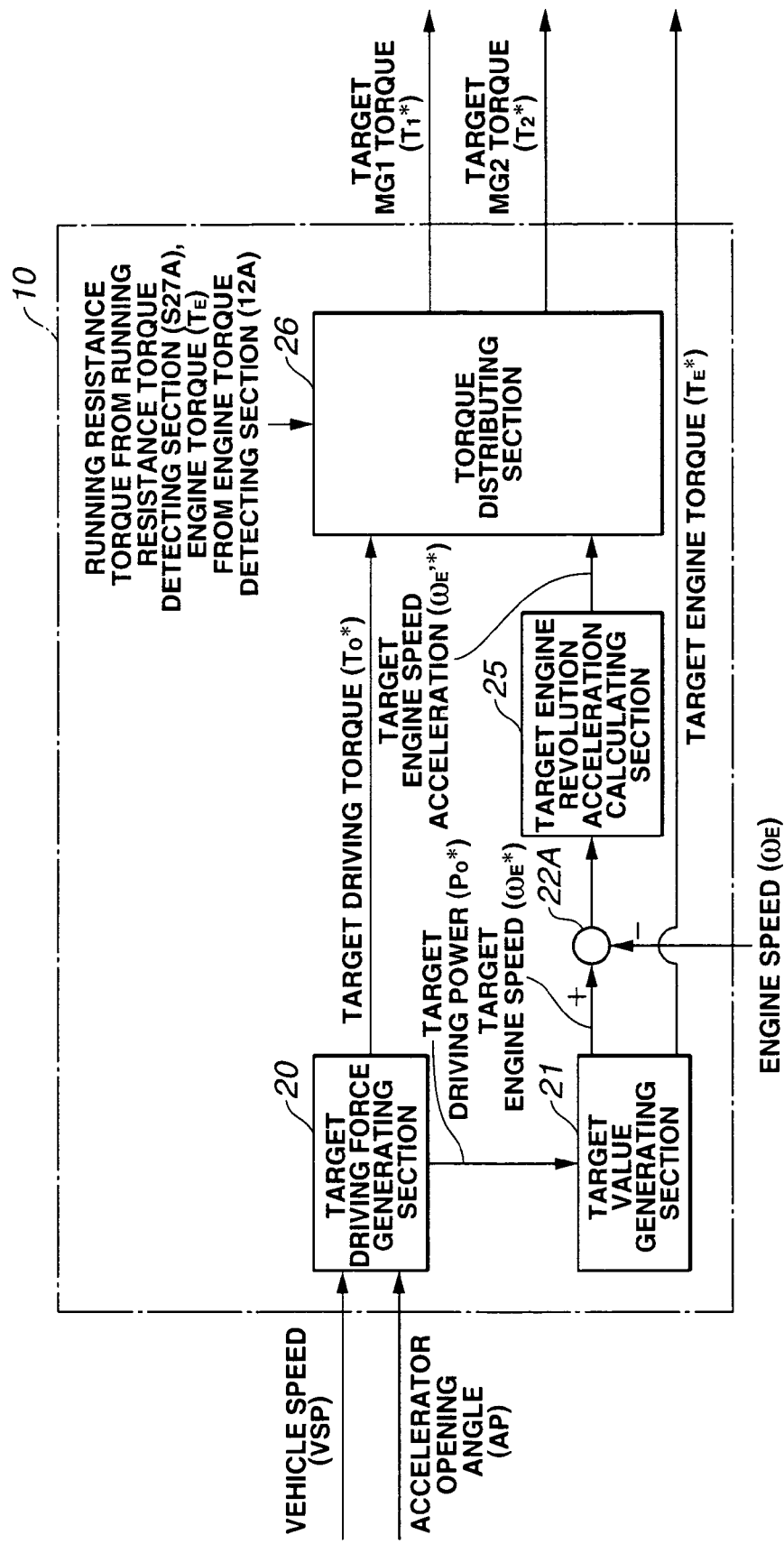
FIG. 9 is a block diagram of a control executed by an integration controller in a third preferred embodiment according to the present invention.

Since the structure of the hybrid transmission shown in FIG. 1 described in the first embodiment and the structure of the highbred vehicle shown in FIG. 2 described in the first embodiment can be applied to a third preferred embodiment of the hybrid vehicle control apparatus according to the present invention, the detailed description and explanation thereof will herein be omitted. FIG. 9 shows a block diagram of the control executed by integration controller 10 in the third preferred embodiment.

It is noted that since target driving force generating (means) (section) 20 and target value generating (means) section 21 are the same as those in the first embodiment, the detailed description thereof will herein be omitted. Target engine revolution speed acceleration calculating section (means) 25 calculates a target engine revolution acceleration $\omega'_E{}^*$, for example, using a sliding mode controller described in the following equations (30) and (31), wherein K denotes a constant determining an upper limit of target engine revolution acceleration and $\epsilon$ denotes a positive constant to make target engine revolution acceleration $\omega'_E{}^*$ continuous in the vicinity to zero of $\sigma$.

$$\omega'_E = K \frac{\sigma}{|\sigma| + \varepsilon}. \tag{30}$$

$$\sigma = \omega^*_E - \omega_E \tag{31}$$

Torque distributing section (means) 26 determines target MG1 torque $T_1^*$ and target MG2 torque $T_2^*$ even if the vehicular condition falls in the gear shift operation and acceleration to achieve target driving torque $T_0^*$ (as recited in original claims 4 and 5).

Using equation (21), a relationship between the torques which satisfies both of target engine revolution acceleration $\omega'_E{}^*$ and target engine torque $T_E^*$ can be expressed as follows:

$$\omega'_E{}^* = b_{11}T_R + b_{12}T_E^* + b_{13}T_1 + b_{14}T_2 \tag{32}$$

In addition, from equation (23), a torque relationship which satisfies both of target driving torque $T_0^*$ and target engine torque $T_E^*$ can be expressed in the following equation.

$$T_0^* = \{(I_C + I_V)b_{21} + 1\}T_R + (I_C + I_V)b_{23}T_1 + (I_C + I_V)b_{24}T_2 \tag{33}$$

If equations (32) and (33) are rearranged, the following equation (34) can be obtained.

$$\begin{bmatrix} T_1^* \\ T_2^* \end{bmatrix} = A_c^1 \left\{ \begin{bmatrix} \omega'_E \\ T_0^* \end{bmatrix} - B_c \begin{bmatrix} T_R \\ T_E \end{bmatrix} \right\} \tag{34}$$

$$A_c = \begin{bmatrix} b_{13} & b_{14} \\ (I_C + I_V b_{23}) & (I_C + I_V)b_{24} \end{bmatrix},$$

$$B_c = \begin{bmatrix} b_{11} & b_{12} \\ (I_C + I_V)b_{21} + 1 & (I_C + I_V)b_{22} \end{bmatrix}.$$

It is noted that running resistance torque $T_R$ may be estimated using the external disturbance observer shown in the second embodiment. In place of target engine torque $T_E^*$, the detection value or estimated value of the engine torque may be used. Using equation (34), target MG1 torque $T_1^*$ and target MG2 torque $T_2^*$ are calculated. At this time, since target driving torque MG1 torque $T_1^*$ and target MG2 torque $T_2^*$ which satisfy target driving torque $T_0^*$ and target engine revolution acceleration $\omega'_E{}^*$ are calculated, the variation in the driving torque doe not delay the achievement of target revolution speed $\omega^*_E$. Consequently, since target driving torque $T_0^*$ and target engine acceleration $\omega'_E{}^*$ can be achieved. Therefore, a feeling of vehicular traveling approximated to the desire of the driver can be achieved.

Figure 10:
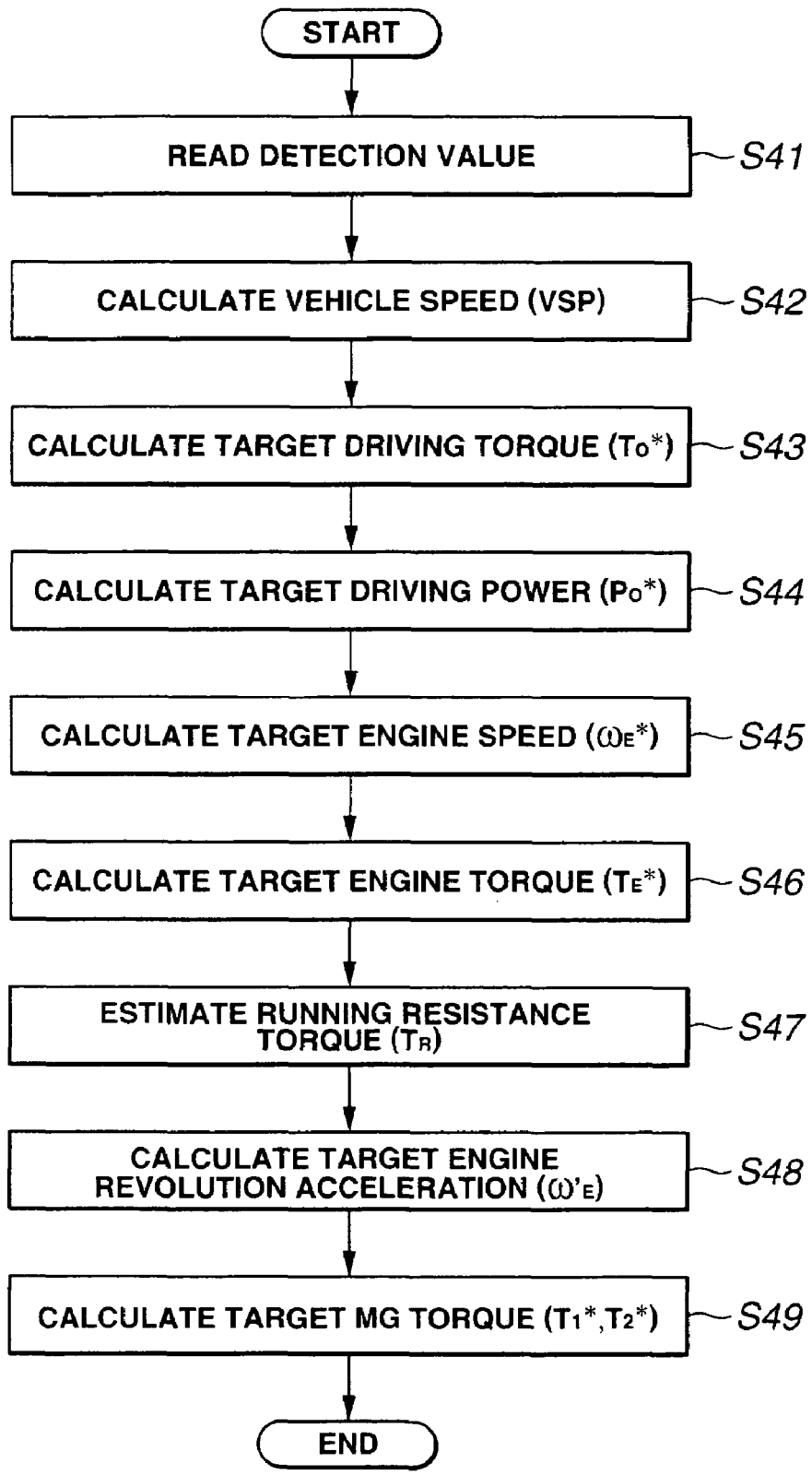
FIG. 10 is an operational flowchart representing a controller calculation purpose executed in the integration controller in the third embodiment shown in FIG. 9.

Next, an operation of the control apparatus in the third embodiment will be described below. The control calculation process executed by integration controller 10 will be described with reference to FIG. 10. The shift control calculation is executed whenever a predetermined period of time, for example, 20 milliseconds has passed.

Since steps S41 through S47 are the same as steps S21 through S47 in the flowchart in the second embodiment (FIG. 8), the detailed description thereof will herein be omitted.

Then, at a step S48, integration controller 10 calculates target engine revolution acceleration $\omega'_E{}^*$ from target engine speed $\omega_E{}^*$ and target engine revolution speed $\omega_E$ using equations (27) and (28). At a step S49, integration controller 10 determines the distribution of target MG1 torque $T_0{}^*$ and target MG2 torque $T_2{}^*$ from target engine revolution acceleration $\omega'_E{}^*$, target driving torque $T_0{}^*$, running resistance torque $T_R$, and engine torque $T_E$. Engine torque $T_E$ used in equation (34) may be changed to target engine torque $T_E{}^*$.

Next, the advantages in the control apparatus in the third embodiment will be described below. In the control apparatus for the hybrid vehicle in the third embodiment can achieve the following advantages in addition to the advantage of item (1) described in the first embodiment.

(5) The above-described target torque calculating means (section) includes: target value generating section 21 (first target torque calculating section) that calculates target engine torque $T_E{}^*$ from target driving power $P_0{}^*$; and the torque distributing section (means)(second target torque calculating section) that solves by establishing a simultaneous equation of two linear coupling equations of a linear coupling equation from among engine revolution acceleration speed $\omega'_E$, engine torque $T_E$, running resistance torque $T_R$, and MG2 torque $T_2$, based on the dynamic characteristic of engine revolution speed $\omega_E$ and the other linear coupling equation from among driving torques T0, engine torque $T_E$, running resistance torque TR, MG1 torque $T_1$, and MG2 torque $T_2$ and which establishes even when the revolution speeds of any two of the Ravigneaux (type) planetary gear unit and distributes and derives target MG1 torque $T_1{}^*$ and target MG2 torque $T_2{}^*$ which are not determined by target value generating section (means) 21 from target engine torque $T_E{}^*$ and target engine revolution acceleration $\omega'_E{}^*$, target driving torque $T_1{}^*$, and running resistance driving torque $T_R$. To achieve target engine revolution acceleration $\omega'_E{}^*$ and target driving torque $T_0{}^*$, integration controller 10 commands to distribute between target MG1 torque $T_1{}^*$ and target MG2 torque $T_2{}^*$. Hence, target driving torque variation does not delay the achievement of target engine revolution acceleration $\omega'_E{}^*$. That is to say, first motor/generator MG1 achieves target engine revolution acceleration $\omega'_E{}^*$, the torque of the first motor/generator MG1 is inputted, and the second motor/generator MG2 achieves the target driving torque $T_0{}^*$. In this case, as a result of the torque variation in second motor/generator MG2 due to the target driving torque variation, engine revolution speed $\omega'_E$ is deviated from target engine revolution speed $\omega'_E{}^*$. After the deviation is detected, first motor/generator MG1 compensates the deviation between engine revolution speed $\omega'_E$ and target engine revolution speed $\omega'_E{}^*$. Hence, the achievement of the target engine revolution speed $\omega'_E{}^*$ is delayed.

(6) In the third embodiment, engine torque detecting section (means) (S21A) that detects or estimates the engine torque is provided. Target value generating section 21 calculates target engine torque $T_E{}^*$ from target driving power $P_0{}^*$. Torque distributing section (means) 21 calculates target engine torque $T_E{}^*$ from target driving power $P_0{}^*$. Torque distributing section (means) 26 calculates target MG1 torque $T_1{}^*$ and target MG2 torque $T_2{}^*$ from engine torque $T_E$, target engine revolution acceleration $\omega'_E{}^*$ target driving torque $T_0{}^*$, and running resistance torque $T_R$. Hence, as compared with engine ENG, the first and second motor/generators MG1 and MG2 whose responses from the variation in the revolution value to the torque variation are fast to achieve target engine revolution speed $\omega'_E{}^*$ and target driving torque $T_0{}^*$. Therefore, the achievements of target engine revolution acceleration $\omega'_E{}^*$ and target driving torque $T_0{}^*$ become faster.

Fourth Embodiment

In the control apparatus of a fourth preferred embodiment, the structure of the hybrid transmission is the same as shown in FIG. 1 and the structure of the hybrid system is shown in FIG. 2. That is to say, since these structures are the same as described in the first embodiment, the detailed description will herein be omitted.

Figure 11:
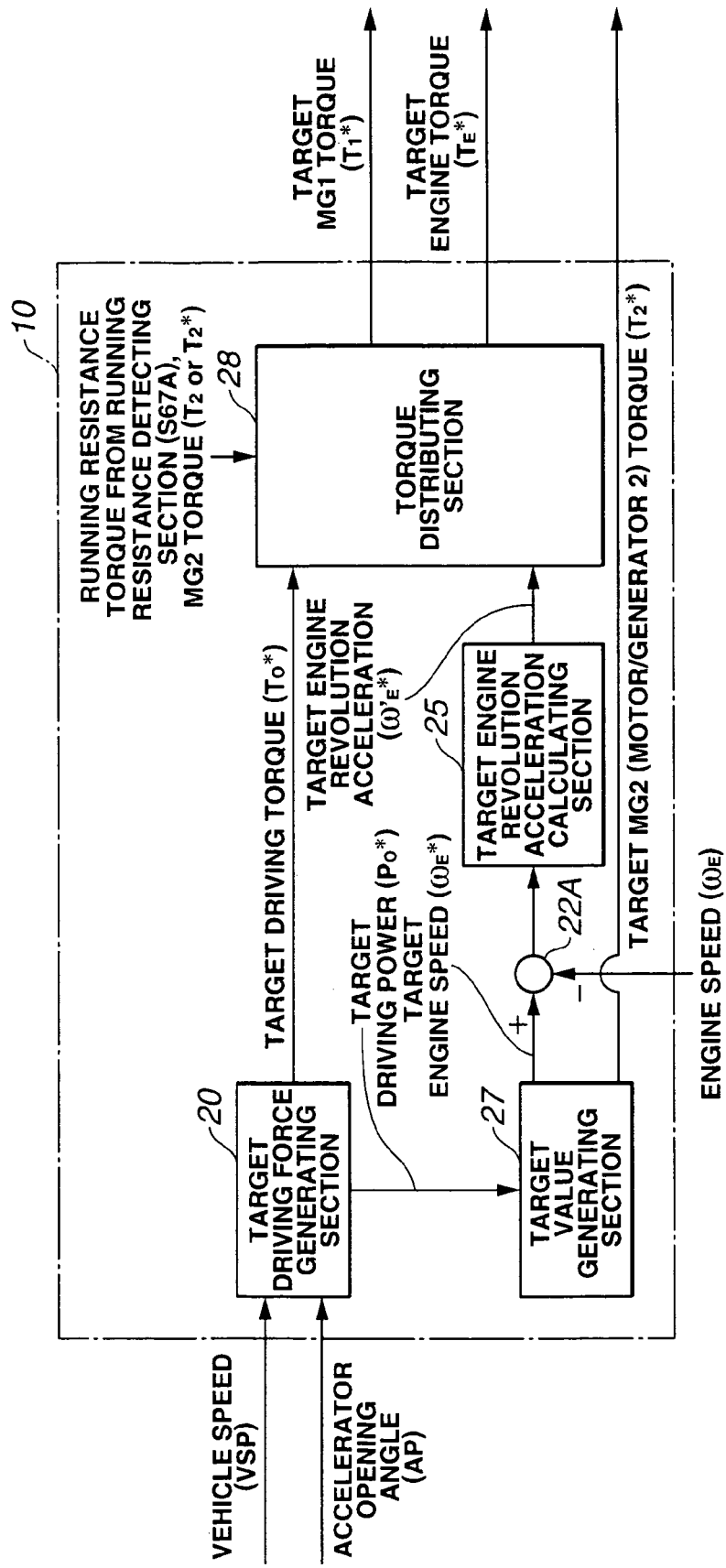
FIG. 11 is a whole functional block diagram executed by the integration controller in a fourth embodiment of the control apparatus according to the present invention.

FIG. 11 shows a control block diagram of the control executed by integration controller 10 in the fourth embodiment. As described in each of the first through third embodiments, target engine torque $T_E{}^*$ is set by means of target value generating section (means) and, thereafter, the target MG1 and MG2 torques are set. However, the present invention is not limited to this. As described below, target value setting section 27 sets either one of the target MG torques (target MG1 torque or target MG2 torque) and, thereafter, the other target MG torque and target engine torque $T_E{}^*$ may be determined (as described in an original claim 4). In addition, the explanation on target driving force generating section (means) 20 will herein be omitted since driving force generating section (means) 20 in the third embodiment is the same as the first embodiment.

Target value generating (section means) 27 calculates target MG2 torque $T_2{}^*$ from target driving power $P_0{}^*$ using a map previously derived by a computer simulation or experiments in such a manner that operating points of engine ENG and first and second motors/generators MG1 and MG2 give operating point at each of which the most favorable efficient energy efficiency is obtained. The explanation of target engine revolution acceleration calculating section (means) 25 will herein be omitted since this section 25 has the same function as described in the third embodiment.

Torque distribution means (section) 28 determines target MG1 torque $T_1{}^*$ and target engine torque $T_E{}^*$ to achieve target driving torque $T_0{}^*$ even during the gear shift and the vehicular acceleration. In the same way in the third embodiment, left sides of equations (33) and (34) are rearranged as $T_1{}^*$ and $T_2{}^*$. Then, the following equation (35) is given.

$$\begin{bmatrix} T_1^* \\ T_E^* \end{bmatrix} = A_c^{-1} \left\{ \begin{bmatrix} \omega'_E \\ T_0^* \end{bmatrix} - B_c \begin{bmatrix} T_R \\ T_2 \end{bmatrix} \right\} \quad (35)$$

wherein $$A_c = \begin{bmatrix} b_{13} & b_{12} \\ (I_C + I_V)b_{23} & (I_C + I_V)b_{22} \end{bmatrix},$$

$$B_c = \begin{bmatrix} b_{11} & b_{14} \\ (I_C + I_V)b_{21} + 1 & (I_C + I_V)b_{24} \end{bmatrix}$$

It is noted that running resistance torque $T_R$ may be estimated using the external disturbance observer described in the second embodiment. Using equation (35), target MG1 torque $T_1^*$ and target MG2 torque $T_E^*$ are calculated. Thus, the excessive lack in the driving torque for target driving torque $T_0^*$ can be compensated. Consequently, target driving torque $T_0^*$ with a high accuracy can be achieved and a sense of acceleration which is near to the desire of the vehicle driver can be obtained.

Figure 12:
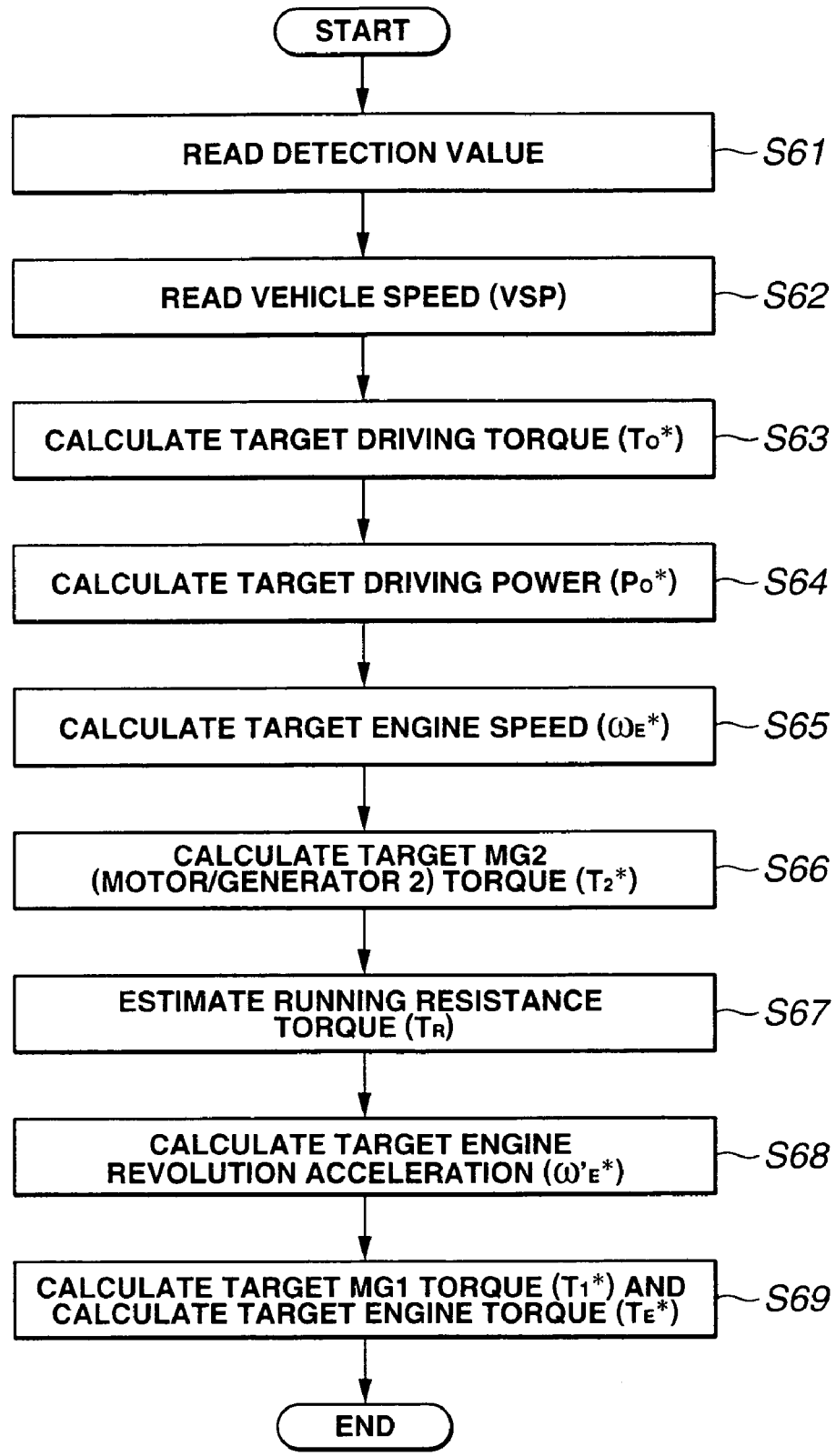
FIG. 12 is an operational flowchart representing the control calculation process calculated in the integration controller in the fourth preferred embodiment shown in FIG. 11.

Next, an operation of the fourth embodiment will be described below. The shift control calculation carried out using the flowchart shown in FIG. 12 is executed whenever a predetermined control period of, for example, 20 milliseconds has passed.

Since contents of steps S61 through S65 are the same as steps S1 through S5 described in the flowchart in the first embodiment (FIG. 6), the detailed explanation thereof will herein be omitted.

Then, at a step S66, integration controller 10 calculates target MG2 torque $T_2^*$ from target driving power $P_o^*$ in such a manner that operating points of engine ENG and first and second motor/generators MG1 and MG2 give operating points at which most favorable efficient energy efficiency is given using a map derived from a computer simulation and experiments previously. Steps of S67 and S68 are the same as steps S47 and S48 in the flowchart of FIG. 10 described in the third embodiment. Hence, the detailed description at steps S47 and S48 will herein be omitted.

At a step S69, integration controller 10 distributes and derives target MG1 torque $T_1^*$ and target engine torque $T_E^*$ from target engine revolution acceleration $\omega'_E{}^*$, target driving torque $T_0^*$, running resistance torque $T_R$, and MG2 torque $T_2$. It is noted that MG2 torque $T_2$ using equation (35) may be replaced with target value thereof.

Next, the advantages of the control apparatus in the fourth embodiment will be described below. The control apparatus in the fourth embodiment has the following advantages in addition to the advantage described in item (1) described in the first embodiment.

(7) The above-described target torque calculating means (section) includes: target value generating section 27 (first target torque calculating section) that calculates target MG2 torque $T_2^*$ from target driving power $P_0^*$; and the torque distributing section 28 (means) (second target torque calculating section) that solves by establishing the simultaneous equation of two linear coupling equations of a linear coupling equation from among engine revolution acceleration $\omega'_E$, engine torque $T_E$, running resistance torque $T_R$, MG1 torque $T_1$, and MG2 torque $T_2$, based on the dynamic characteristic of engine revolution speed $\omega_E$ and the other linear coupling equation from among driving torques $T_0$, engine torque $T_E$, running resistance torque $T_R$, MG1 torque $T_1$, and MG2 torque $T_2$ and which establishes even when the revolution speeds of any two of the revolution elements of Ravigneaux (type) planetary gear unit and distributes and derives target MG1 torque $T_1^*$ and target MG2 torque $T_2^*$, which are not determined by target value generating section (means) 27, from among target MG2 torque $T_2^*$ derived at target value generating section (means) 27, target engine revolution acceleration $\omega'_E{}^*$, target driving torque $T_0^*$, and running resistance torque $T_R$. Integration controller 10 commands to distribute between target MG1 torque $T_1^*$ and target MG2 torque $T_2^*$ to achieve target engine revolution acceleration $\omega'_E{}^*$ and target driving torque $T_0^*$. Hence, target driving torque variation does not delay the achievement of target engine revolution acceleration $\omega'_E{}^*$.

As described above, the control apparatus for the hybrid vehicle has been described on the basis of the first through fourth embodiments. A specific structure of the control apparatus is not limited to these embodiments. Various changes and modifications can be made without the spirit and scope of the present invention which is defined in the claims.

For example, the present invention is applicable to the hybrid vehicle using the revolution two-degrees-of-freedom planetary gear unit. Furthermore, the present invention is applicable to the hybrid vehicle having a clutch in which the engine and planetary gear unit are connected together and disconnected. In this case, in place of the engine speed ($\omega_E$), an input axle revolution speed of the planetary gear unit may be controlled to achieve the gear shift control. In place of engine torque $T_E$, the torque of the clutch may be used for the control procedure described above.

In addition, the present invention can be expected to exhibit the advantages when any one revolution element of the planetary gear unit is fixed to a transmission casing through a brake so that the hybrid transmission provides a fixed gear ratio transmission and the present invention is used to control the gear shift during a brake release and during a stop of engine. It is noted that each of a reference numeral 22A shown in FIGS. 3, 7, 9, and 11 denotes a deviation detector (or subtractor) and subscript 0=subscript o, for example, $P_0^*$=Po*.

The entire contents of a Japanese Patent Application No. 2003-035867 (filed in Japan on Feb. 14, 2003) are herein incorporated by reference. The scope of the invention is defined with reference to the following claims.

What is claimed is:

1. A control apparatus for a hybrid vehicle, comprising:
    a power transmission mechanism that is constituted by one or more of planetary gear units, that transmits a driving force developed in an engine to a drive axle and whose dynamic characteristic is represented in revolution two-degrees-of-freedom system;
    a first motor/generator that supplies a power to the drive axle via the power transmission mechanism;
    a second motor/generator that supplies the power at least one of directly and via the power transmission mechanism to the drive axle;
    a target driving force generating section that calculates a target driving power and a target driving torque from at least one of detected values and estimated values of both of a vehicle speed and an accelerator opening angle;
    a target engine speed calculating section that calculates a target engine speed from the target driving power; and
    a target torque calculating section that sets target values of motor torques of the first and second motors/generators and of an engine torque from at least one of revolution speed variation rates of any two revolution elements of the power transmission mechanism and a running resistance torque, the target engine speed, an engine speed, the target driving power, and the target driving torque in such a manner that no excessive lack in the driving torque for the target driving torque occurs and a deviation between the target engine speed and the engine speed is decreased.

2. A control apparatus for a hybrid vehicle as claimed in claim 1, wherein the target torque calculating section calculates a quantity corresponding to the revolution speed variation of any two revolution elements of the power transmission mechanism from the running resistance torque, an engine torque, and the motor torques of the first and second motors/generators.

3. A control apparatus for a hybrid vehicle as claimed in claim 1, wherein the target torque calculating section comprises: a target engine torque generating section that calculates a target engine torque from the target driving power, a first motor torque calculating section that determines the target value of the first motor torque of the first motor/generator in such a manner that the deviation between the target engine speed and the engine speed is decreased and a second motor torque calculating section that determines the target value of the second motor torque from the target driving torque, the engine torque, the running resistance torque, and the first motor torque, using a transient relationship from among the driving torque, the engine torque, the running resistance torque, the first motor torque, and the second motor torque.

4. A control apparatus for a hybrid vehicle as claimed in claim 1, wherein the target torque calculating section comprises: a first target torque calculating section that calculates any one target value of the engine torque, the target value of the first motor torque of the first motor/generator, and the target value of the second motor torque of the second motor/generator; a second target torque calculating section that calculates the remaining two torque target values from among the engine torque, the first motor torque, and the second motor torque which are not determined by the target torque generating section from the torque target value determined by the target torque generating section, a target engine revolution acceleration, the target driving torque, and the running resistance torque, using two relationships of a transient relationship among an engine revolution acceleration, the engine torque, the running resistance torque, the first motor torque, and the second motor torque, and another transient relationship among the driving torque, the engine torque, the running resistance torque, the fist motor torque, and the second motor torque.

5. A control apparatus for a hybrid vehicle as claimed in claim 4, wherein the control apparatus further comprises an engine torque detecting section that detects or estimates the engine torque and wherein the first target torque calculating section calculates a target value of the engine torque from the target driving power and the second target torque calculating section calculates the target values of the first motor torque and the second motor torque from the engine torque, the target engine revolution acceleration, the target driving torque, and the running resistance torque.

6. A control apparatus for a hybrid vehicle as claimed in claim 2, wherein the running resistance torque ($T_R$) is estimated by a running resistance torque estimating section using a disturbance observer from the revolution speeds of any two revolution elements of the power transmission mechanism, and the engine torque, the first and second motor torques.

7. A control apparatus for a hybrid vehicle as claimed in claim 1, wherein the target driving force generating section calculates the target driving torque (To*) at an output axle of the power transmission mechanism by referring to a predetermined map representing a driving torque-to-vehicle speed with the accelerator opening angle (AP) as a parameter and, thereafter, calculates the target driving power (PO*) from the calculated target driving torque (To*) and a revolution speed ($\omega$o) of the output axle of the power transmission mechanism.

8. A control apparatus for a hybrid vehicle as claimed in claim 7, wherein the vehicle speed (VSP) is estimated from the revolution speed ($\omega$o) at the output axle of the power transmission mechanism.

9. A control apparatus for a hybrid vehicle as claimed in claim 7, wherein the target driving force generating section comprises a target value generating section that calculates the target engine speed ($\omega_E^*$) using a driving force-to-engine speed map from the calculated target driving power (Po*).

10. A control apparatus for a hybrid vehicle as claimed in claim 8, wherein the target driving force generating section calculates the target engine torque ($T_E^*$) as follows: $T_E^* = Po^*/\omega_E^*$.

11. A control apparatus for a hybrid vehicle as claimed in claim 10, wherein the control apparatus further comprises a torque target value calculating section including an engine revolution controlling section that determines the target value of the first motor torque ($T_1^*$) as follows to decrease the deviation between the target engine speed ($\omega_E^*$) and an actual engine speed ($\omega_E$): $T_1^* = \{Kp + (K_I/s)\} \cdot (\omega_E^* - \omega_E)$, wherein $K_p$ denotes a proportional gain, $K_I$ denotes an integration gain, and s denotes a Laplace transform operator.

12. A control apparatus for a hybrid vehicle as claimed in claim 11, wherein the torque target value calculating section comprises a driving force controlling section that calculates the second motor target torque ($T_2^*$) to achieve the target driving torque (To*) at the output axle of the power transmission mechanism, the set engine torque ($T_E$), a target engine acceleration ($\omega'_E{}^*$), and an actual revolution acceleration ($\omega$o') of the output axle of the power transmission mechanism.

13. A control apparatus for a hybrid vehicle as claimed in claim 12, wherein the engine torque ($T_E$) is replaced with the calculated target engine torque ($T_E^*$).

14. A control apparatus for a hybrid vehicle as claimed in claim 2, wherein the target torque calculating section comprises a driving force controlling section that calculates the target value of the second motor torque ($T_2^*$) on the basis of a target driving torque (To*), a first target torque ($T_1^*$), the engine torque ($T_E$), the running resistance torque ($T_R$), the engine speed ($\omega_E$) and the revolution speed ($\omega$o) of an output axle of the power transmission mechanism.

15. A control apparatus for a hybrid vehicle as claimed in claim 4, wherein the control apparatus further comprises a target engine revolution acceleration calculating section that calculates the target engine revolution acceleration ($\omega_E'^*$) from the deviation between the target engine revolution speed ($\omega_E^*$) and the engine speed ($\omega_E$) in such a manner that the deviation therebetween becomes decreased.

16. A control apparatus for a hybrid vehicle as claimed in claim 4, wherein the target torque calculating section comprises a target value generating section that sets the target second motor torque ($T_2^*$) on the basis of the target driving power (Po*) in such a manner that operating points of the engine (ENG) and first and second motors/generators (MG1, MG2) are most favorable energy efficient operating points.

17. A control apparatus for a hybrid vehicle as claimed in claim 15, wherein the target torque calculating section comprises a torque distributing section that determines the target first motor torque ($T_1^*$) of the first motor/generator and the target second motor torque ($T_2^*$) of the second motor/generator to achieve the target driving torque (To*) at an output axle of the power transmission mechanism from the running resistance torque ($T_R$), the target engine revolution acceleration ($\omega_E'^*$), the engine torque ($T_E$), and target driving torque (To*).

18. A control apparatus for a hybrid vehicle as claimed in claim 16, wherein the target torque calculating section comprises a torque distributing section that determines the target first motor torque ($T_1^*$) and the target engine torque ($T_E^*$) to achieve the target driving torque (To*) from the target engine revolution acceleration ($\omega_E'^*$), the target driving torque (To*) at an output axle of the power transmission mechanism, the running resistance torque ($T_R$), and the target second motor torque ($T_2^*$) of the second motor/generator.

19. A control apparatus for a hybrid vehicle, comprising:
a power transmission mechanism that is constituted by one or more of planetary gear units, that transmits a driving force developed in an engine to a drive axle and whose dynamic characteristic is represented in revolution two-degrees-of-freedom system;
a first motor/generator that supplies a power to the drive axle via the power transmission mechanism;
a second motor/generator that supplies the power at least one of directly and via the power transmission mechanism to the drive axle;
target driving power generating means for calculating a target driving power and a target driving torque from at least one of detected values and estimated values of both of a vehicle speed and an accelerator opening angle;
target engine speed calculating means for calculating a target engine speed from the target driving power; and
target torque calculating means for setting target values of motor torques of the first and second motors/generators and of an engine torque from at least one of revolution speed variation rates of any two revolution elements of the power transmission mechanism and a running resistance torque, the target engine speed, an engine speed, the target driving power, and the target driving torque in such a manner that no excessive lack in the driving torque for the target driving torque occurs and a deviation between the target engine speed and the engine speed is decreased.

20. A control method for a hybrid vehicle, comprising:
providing a power transmission mechanism that is constituted by one or more of planetary gear units, that transmits a driving force developed in an engine to a drive axle and whose dynamic characteristic is represented in revolution two-degrees-of-freedom system;
providing a first motor/generator that supplies a power to the drive axle via the power transmission mechanism;
providing a second motor/generator that supplies the power at least one of directly and via the power transmission mechanism to the drive axle;
calculating a target driving power and a target driving torque from at least one of detected values and estimated values of both of a vehicle speed and an accelerator opening angle;
calculating a target engine speed from the target driving power; and
setting target values of motor torques of the first and second motors/generators and of an engine torque from at least one of revolution speed variation rates of any two revolution elements of the power transmission mechanism and a running resistance torque, the target engine speed, an engine speed, the target driving power, and the target driving torque in such a manner that no excessive lack in the driving torque for the target driving torque occurs and a deviation between the target engine speed and the engine speed is decreased.

* * * * *